April 23, 1940.    W. BARTON    2,197,917
ABRADING TOOL
Filed Jan. 5, 1939

INVENTOR
William Barton
By his attorney
Victor Cobb

Patented Apr. 23, 1940

2,197,917

UNITED STATES PATENT OFFICE 2,197,917

ABRADING TOOL

William Barton, Leicester, England, assignor to United Shoe Machinery Corporation, Borough of Flemington, N. J., a corporation of New Jersey Application January 5, 1939, Serial No. 249,381
In Great Britain February 1, 1938

2 Claims. (Cl. 51—190)

This invention relates to abrading tools suitable for use in the manufacture or repair of boots and shoes and is herein illustrated and described as embodied in a heel scouring wheel. The wheel herein disclosed is of a well-known type wherein the abrasive covering of sheet material is supported upon a flexible, resilient bed.

It is an object of the present invention to provide an improved flexible bed for tools of the type above referred to. In accordance with a feature of the invention the bed herein illustrated comprises a layer of sponge rubber having a face of crepe rubber secured upon its outer surface, the sponge rubber itself being secured to a backing adapted to be mounted on a roll body. In the construction herein illustrated the layer of sponge rubber is seated in a channel-shaped member of rubber having a solid texture and relatively great firmness, which member is provided with flanges for retaining the lateral edges of the sponge rubber layer against spreading under pressure of the work.

The invention further consists in various features of construction and combinations and arrangements of parts herein shown and claimed, the advantages of which will be apparent to those skilled in the art from the following description, reference being had to the accompanying drawing, in which Fig. 1 is a side view of the improved heel scouring wheel bottom;

It is a common practice in the manufacture of heel scouring wheels to secure a flexible bed formed of a strip of felt about one-half an inch thick to a leather backing which, in turn, is fastened to the outer surface of a metal strip of approximately circular form usually about six inches in diameter with its ends nearly abutting. Such a bed can readily be applied to a roll body formed in two parts hinged together and provided with a third locking part as disclosed in United States Letters Patent No. 1,030,538, granted June 25, 1912, upon the application of William A. Reed. The felt, together with the leather backing and the metal strip, constitutes a "refill" bed ready for application to a wheel body.

Figure 1:
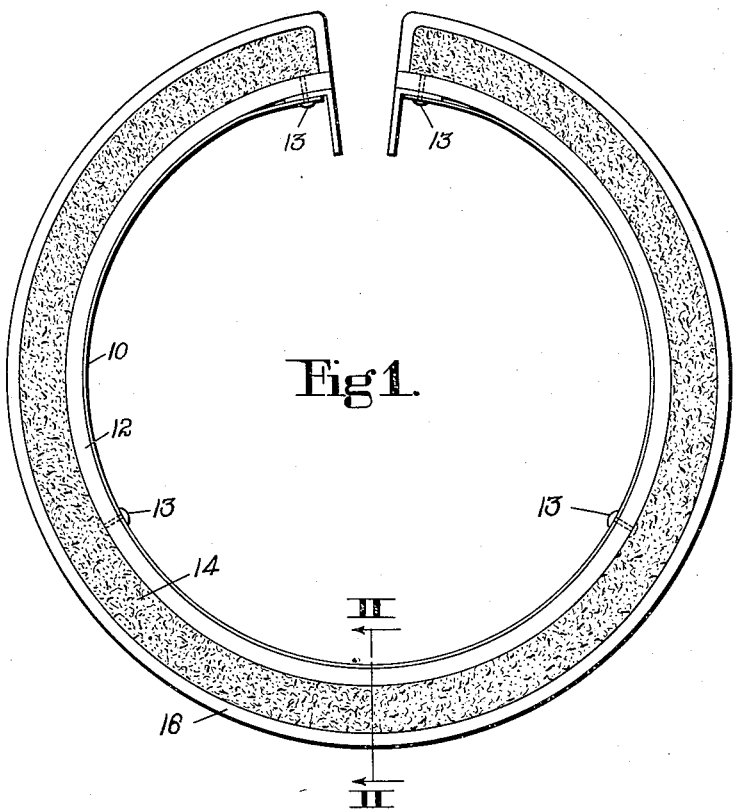
Figure 2:
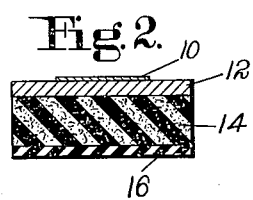
Fig. 2 is a cross-sectional view on the line II—II of Fig. 1.

In preparing a bed of this general type according to the present invention the felt is omitted. The usual foundation, however, consisting of a circular strip 10 of sheet metal and a leather backing 12 secured together by rivets 13 is provided. Upon the outer surface of the leather backing is cemented a strip of sponge rubber 14 (Figs. 1 and 2). For an example of types of sponge rubber suitable for this purpose reference may be had to British Letters Patent Nos. 332,525 and 332,526, dated March 21, 1929, upon the application of Dunlop Rubber Company et al. This rubber is often supplied with a backing on one side of thin woven cotton material, in which case the side which is backed with cotton should be against the leather. The outer surface of the sponge rubber may be cylindrical, as shown herein, or it may be shaped across its width to any desired curvature. In any case, however, a layer of unvulcanized crepe rubber 16, preferably of the variety known as plantation crepe, is adhesively secured upon the outer surface of the sponge rubber. The layer of crepe rubber 16 is preferably about one-sixteenth of an inch or slightly more in thickness. By interposing the thin layer of crepe rubber between the sponge rubber and the sandpaper, the relatively soft and easily damaged surface of the sponge rubber is protected, while preserving, to a large degree, the yieldable features of the sponge rubber.

In the use of heel scouring wheels constructed as above described it has been found that while the sponge rubber strip and the crepe rubber layer form a satisfactory cushion for an abrasive cover, nevertheless under certain conditions of operation the sponge rubber strip and the crepe rubber layer tend to yield laterally, that is, in the direction of the axis of the roll, thereby making it difficult for the operator to confine the scouring operation within precise limits upon the work. For example, this effect may render it difficult for the operator in scouring a heel attached to a shoe to scour the heel precisely to the rand crease without damaging the upper of the shoe.

Figure 3:
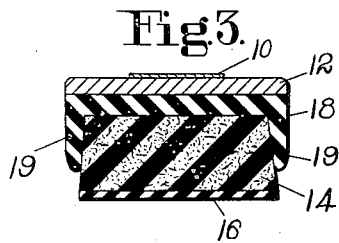
Fig. 3 is a cross-sectional view of a construction alternative to that of Fig. 2.

This difficulty may be overcome by employing a modified construction illustrated in Fig. 3 wherein the sponge rubber layer 14 is seated in a channel-shaped member 18 which is composed of vulcanized rubber having a more solid texture and a greater degree of firmness than the sponge rubber layer 14. The channel-shaped member 18 has a pair of spaced flanges 19 which extend over the lateral edges of the sponge rubber layer 14 to support the sponge rubber layer from yielding laterally under pressure of the work. The retaining member 18 may be of a somewhat hard vulcanized rubber similar to that employed for the outer covers of rubber tires and it may be secured to the outer surface of the leather backing 12 by stitching. If desired the crepe layer 16 may be extended over the edges of the sponge rubber layer to meet or to pass inside the flanges 19 of the retaining member.

It is evident that flexible beds of the construction herein disclosed may be substituted for the usual felt in heel scouring wheels or other tools regardless of the particular arrangement employed for attaching the beds to the bodies or hubs of the wheels or rolls.

Having thus described my invention, what I claim as new and desire to secure by Letters Patent of the United States is:

1. A flexible bed for a shoe scouring roll comprising a layer of sponge rubber, and a channel-shaped member in which said sponge rubber layer is seated, said channel-shaped member being composed of solid vulcanised rubber and having radially extending flanges constructed and arranged to retain the lateral edges of the sponge rubber layer against spreading under pressure of the work.

2. A flexible bed for a shoe scouring roll comprising a layer of sponge rubber, an annular channel shaped member of flexible material the firmness of which is greater than that of said sponge rubber layer, said channel-shaped member having flanges between which said sponge rubber layer is seated and which are constructed and arranged to retain the lateral edges of the sponge rubber layer from spreading under pressure of the work, a facing of crepe rubber upon the outer face of the sponge rubber layer, and a backing for said channel-shaped member adapted to be mounted on a roll body.

WILLIAM BARTON.